United States Patent
Cao

(10) Patent No.: US 10,955,100 B2
(45) Date of Patent: Mar. 23, 2021

(54) LIGHT EMITTING MODULE WITH LIGHT GUIDE PLATE FOR AUTOMOTIVE HEADLIGHT

(71) Applicant: Lumileds LLC, San Jose, CA (US)

(72) Inventor: Yiyu Cao, Shanghai (CN)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/472,107

(22) PCT Filed: Dec. 22, 2017

(86) PCT No.: PCT/EP2017/084433
§ 371 (c)(1),
(2) Date: Jun. 20, 2019

(87) PCT Pub. No.: WO2018/115468
PCT Pub. Date: Jun. 28, 2018

(65) Prior Publication Data
US 2019/0309920 A1    Oct. 10, 2019

(30) Foreign Application Priority Data

Dec. 23, 2016  (WO) ................ PCT/CN2016/111628
Jan. 16, 2017  (EP) .................................... 17151648

(51) Int. Cl.
*F21S 41/24*       (2018.01)
*F21S 41/663*      (2018.01)
(Continued)

(52) U.S. Cl.
CPC ............ *F21S 41/24* (2018.01); *B60Q 1/0041* (2013.01); *B60Q 1/0058* (2013.01); *B60Q 1/04* (2013.01);
(Continued)

(58) Field of Classification Search
CPC .......... B60Q 1/0041–0058; B60Q 1/28; G02B 6/0036; F21S 41/24; F21S 41/285; F21S 43/235–251
See application file for complete search history.

(56) References Cited

U.S. PATENT DOCUMENTS 7,278,768 B2 * 10/2007 Gasquet ................ F21S 43/239
                                                362/539
2003/0193815 A1 * 10/2003 Mishimagi ............ B60R 1/1207
                                                362/522

(Continued)

FOREIGN PATENT DOCUMENTS

CN    102955196 A    3/2013
DE    10101795 A1    7/2002
(Continued)

OTHER PUBLICATIONS

EPO as ISA, PCT/EP2017/084433 filed Dec. 22, 2017, "International Search Report and Written Opinion", dated May 4, 2018, 16 pages.
(Continued)

*Primary Examiner* — Mariceli Santiago

(57) ABSTRACT

The present invention provides a light emitting module with a light guide plate for an automotive headlight, which light guide plate includes a front surface for exiting light; a rear surface positioned opposite to the front surface and used as a first light incidence surface for introducing a first light beam; and a side surface positioned at a side of the light guide plate and used as a second light incidence surface for introducing a second light beam. The light guide plate has a number of concave structures at the rear surface thereof for refracting the first light beam downwards towards the ground and for reflecting the second light beam forwards (Continued)

towards the front surface of the light guide plate. The overall output light beam pattern according to the present invention would appear to be uniform.

14 Claims, 4 Drawing Sheets

(51) Int. Cl.
*F21S 43/249* (2018.01)
*F21S 43/239* (2018.01)
*F21S 43/245* (2018.01)
*F21V 8/00* (2006.01)
*F21S 41/32* (2018.01)
*F21S 41/148* (2018.01)
*B60Q 1/00* (2006.01)
*B60Q 1/04* (2006.01)
*B60Q 1/28* (2006.01)
*F21W 103/10* (2018.01)
*F21W 103/55* (2018.01)

(52) U.S. Cl.
CPC .............. *B60Q 1/28* (2013.01); *F21S 41/148* (2018.01); *F21S 41/322* (2018.01); *F21S 41/663* (2018.01); *F21S 43/239* (2018.01); *F21S 43/245* (2018.01); *F21S 43/249* (2018.01); *G02B 6/0036* (2013.01); *G02B 6/0065* (2013.01); *G02B 6/0068* (2013.01); *B60Q 2400/30* (2013.01); *F21W 2103/10* (2018.01); *F21W 2103/55* (2018.01)

(56) References Cited

U.S. PATENT DOCUMENTS

| | | | | |
|---|---|---|---|---|
| 2009/0027911 A1* | 1/2009 | Misawa | ................ | F21V 7/0091 362/518 |
| 2015/0138821 A1* | 5/2015 | Kosuge | ................... | F21S 41/28 362/511 |
| 2015/0292704 A1* | 10/2015 | Koshiro | ................. | F21S 43/14 362/511 |
| 2017/0227182 A1* | 8/2017 | Hirata | ..................... | F21S 41/00 |
| 2019/0293857 A1* | 9/2019 | Martoch | ............... | F21S 43/247 |

FOREIGN PATENT DOCUMENTS

| | | | | |
|---|---|---|---|---|
| DE | 10200359 A1 | | 7/2003 | |
| DE | 10207694 A1 | | 11/2003 | |
| DE | 102009005351 A1 | | 8/2009 | |
| DE | 212011100156 U1 | | 6/2013 | |
| JP | S5943234 U | | 3/1984 | |
| JP | 2008147032 A | * | 6/2008 | .......... B60Q 1/2607 |
| JP | 2013062074 A | * | 4/2013 | |
| JP | 6278510 B2 | * | 2/2018 | |
| JP | 2018045896 A | * | 3/2018 | .............. F21S 41/24 |

OTHER PUBLICATIONS

Extended European Search Report dated Aug. 11, 2017, European Patent Application No. 17151648.7, 8 pages.

* cited by examiner

LIGHT EMITTING MODULE WITH LIGHT GUIDE PLATE FOR AUTOMOTIVE HEADLIGHT

CROSS-REFERENCE TO RELATED APPLICATIONS

The present application is a § 371 application of International Application No. PCT/EP2017/084433 filed on Dec. 22, 2017 and titled "LIGHT EMITTING MODULE WITH LIGHT GUIDE PLATE FOR AUTOMOTIVE HEADLIGHT," which claims the benefit of International Application No. PCT/CN2016/111628 filed on Dec. 23, 2016 and European Patent Application No. 17151648.7 filed on Jan. 16, 2017. International Application No. PCT/EP2017/084433, International Application No. PCT/CN2016/111628, and European Patent Application No. 17151648.7 are incorporated herein.

BACKGROUND OF THE DISCLOSURE

1. Field of the Disclosure

The present disclosure relates to the field of lighting systems, specifically to a light emitting module with a light guide plate for an automotive headlight.

2. Description of the Prior Art

The trends of automotive exterior lights are becoming more and more uniform. Take an automotive tail light for instance, it is changed from a dotty style to a light guide style, which allows looking from a very near distance yet can't see hot or dark areas. DE10207694A1 for example proposed a brake or turn signal lamp using a light guide plate in front of the brake or turn signal light source. A second light source couples its light sideward into the light guide plate which contains deflecting elements redirecting such light into the rear direction, thus turning the light guide plate into a homogenously illuminated "light curtain" for the brake or turn signal light source.

But for a low beam part of an automotive headlamp, because of the high standard requirement of the low beam intensity, it's very hard to manufacture a low beam part with a uniform beam shape. Therefore, it is necessary to provide an easy and convenient way to render the low beam part of the automotive headlamp uniform.

SUMMARY OF THE DISCLOSURE

The object of the present disclosure is to provide a light guide plate in front of a low beam part of an automotive headlamp to render the low beam uniform.

In order to achieve the above-mentioned object, the present disclosure provides a light guide plate for an automotive headlight, which includes: a front surface for exiting light; a rear surface positioned opposite to the front surface and used as a first light incidence surface for introducing a first light beam; and a side surface positioned at a side of the light guide plate and used as a second light incidence surface for introducing a second light beam. The light guide plate has a plurality of concave structures at the rear surface thereof for refracting the first light beam downwards towards the ground and for reflecting the second light beam forwards towards the front surface of the light guide plate.

Since the light guide plate has a plurality of concave structures at the rear surface thereof for refracting the first light beam (usually the low beam) downwards towards the ground and for reflecting the second light beam (usually the light beam from a daytime running lamp or a front position lamp) forwards towards the front surface of the light guide plate, when the first light beam and the second light beam are both turned on at night, the overall output light beam pattern would appear to be uniform when looked from above the cut-off line of the low beam.

According to an embodiment of the disclosure, the light guide plate has a plurality of diffusion structures at the front surface thereof for diffusing the second light beam reflected by the concave structures, and the plurality of concave structures are configured to reflect the second light beam forwards towards the plurality of diffusion structures.

According to an embodiment of the disclosure, each of the concave structures is a prism-shaped structure, a pyramid-shaped structure or a wedge-shaped structure.

According to an embodiment of the disclosure, the pyramid is a rectangular pyramid and the prism is a triangular prism.

According to an embodiment of the disclosure, the triangular prism is a triangular upright prism with three side surfaces perpendicular to two base surfaces.

According to an embodiment of the disclosure, an angle between a first side surface and a second side surface of the triangular upright prism is 90°.

According to an embodiment of the disclosure, the first side surface of the triangular upright prism extends along the rear surface of the light guide plate.

According to an embodiment of the disclosure, each of the two base surfaces of the triangular upright prism has a triangle shape with a first right-angle edge and a second right-angle edge, the length of the first right-angle edge being equal to or larger than that of the second right-angle edge.

According to another embodiment of the disclosure, the length of the first right-angle edge is about 0.8-2.5 times as large as that of the second right-angle edge.

According to still another embodiment of the disclosure, the plurality of concave structures and the plurality of diffusion structures are respectively arranged equidistantly in rows, and the size and level in vertical direction of each row of the concave structures are substantially equal to the size and level in vertical direction of a corresponding row of the diffusion structures.

Accordingly, the present disclosure provides a light emitting module for an automotive headlight, which comprises: the above light guide plate; a first lighting unit positioned backwards and at a distance from the rear surface of the light guide plate; and a second lighting unit positioned sidewards of the side surface of the light guide plate.

According to an embodiment of the disclosure, the first lighting unit is a low beam lighting unit of the automotive headlight, and the second lighting unit is a daytime running lamp lighting unit or a front position lighting unit of the automotive headlight.

According to an embodiment of the disclosure, the first lighting unit comprises a first light source and a first reflector for redirecting the light beam of the first light source in a direction perpendicular to the rear surface of the light guide plate, and the second lighting unit comprises a second light source and a second reflector for redirecting the light beam of the second light source in a direction perpendicular to the side surface of the light guide plate.

According to another embodiment of the disclosure, the second lighting unit is configured such that the light beam emitted from the second lighting unit can be totally internally reflected at a side surface of the concave structures facing the second lighting unit.

According to still another embodiment of the disclosure, the light guide plate is made of PMMA, the second lighting unit is configured such that the light beam emitted from the second lighting unit can hit a side surface of the concave structures facing the second lighting unit at an incidence angle bigger than 42°.

BRIEF DESCRIPTION OF THE DRAWINGS

Specific embodiments of a light guide plate and a light emitting module of the present disclosure will be exemplarily illustrated below with reference to the figures. In addition, it should be noted that the illustration does not limit the present disclosure in any manner. In these figures.

DETAILED DESCRIPTION OF THE PRESENT DISCLOSURE

Figure 1:
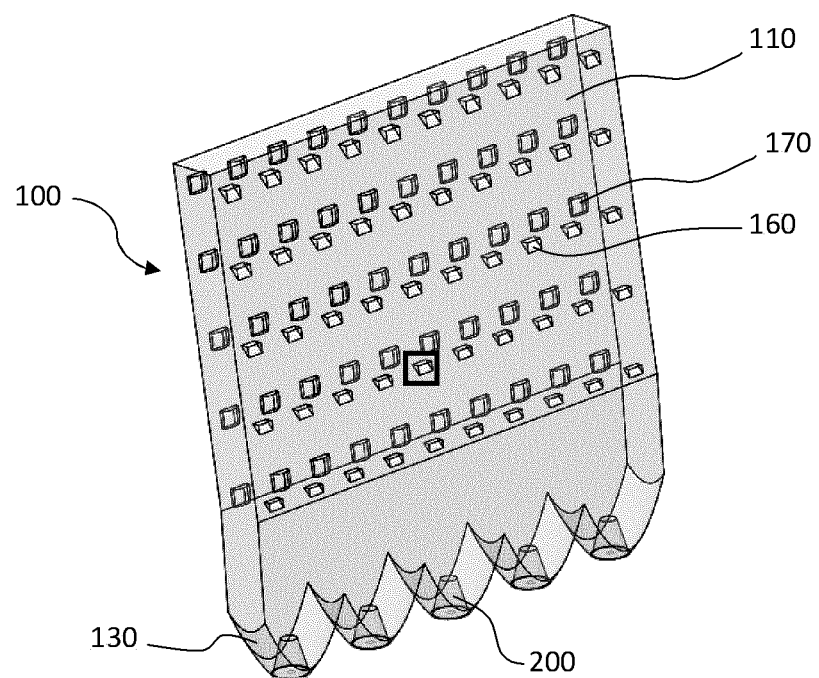
FIGS. 1-3 are perspective views of a light guide plate according to an embodiment of the present disclosure.
Figure 2:
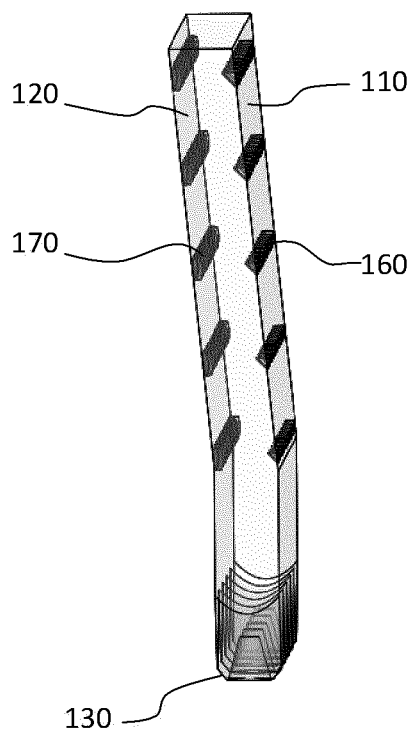
Figure 3:
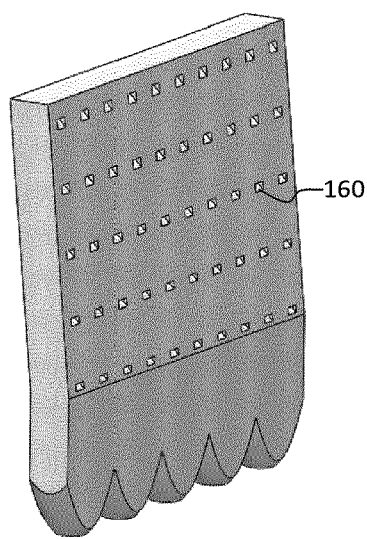

As shown in FIGS. 1-7, according to an embodiment of the present disclosure, a light guide plate 100 for an automotive headlight is provided in front of a low beam lighting unit (now shown) of the automotive headlamp. The light guide plate 100 includes: a front surface 120 for exiting light; a rear surface 110 positioned opposite to the front surface 120 and used as a first light incidence surface for introducing a first light beam 310; and a side surface 130 positioned at a side of the light guide plate 100 and used as a second light incidence surface for introducing a second light beam 210. The light guide plate 100 has a plurality of concave structures 160 at the rear surface 110 thereof for refracting the first light beam 310 downwards towards the ground (see FIG. 6) and for reflecting the second light beam 210 forwards towards the front surface 120 of the light guide plate 100.

The front surface 120 of the light guide plate 100 has a plurality of diffusion structures 170 thereat for diffusing the second light beam 210 reflected by a surface "bfgc" of the concave structures 160. The plurality of concave structures 160 are configured to reflect the second light beam 210 forwards towards the plurality of diffusion structures 170 also by the surface "bfgc" thereof. The plurality of diffusion structures 170 may be printed dots, protrusions, grooves or recesses arranged at the front surface 120 of the light guide plate 100.

Figure 4:
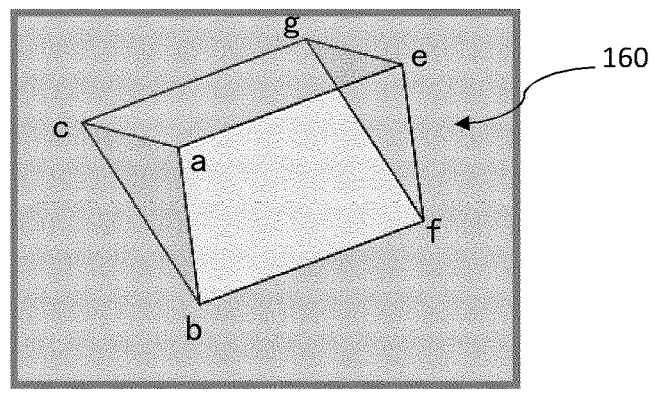
FIG. 4 is an enlarged partial view of FIG. 1 showing the details of a concave structure of the light guide plate.
Figure 5:
FIG. 5 is a plan side view of FIG. 3.
Figure 6:
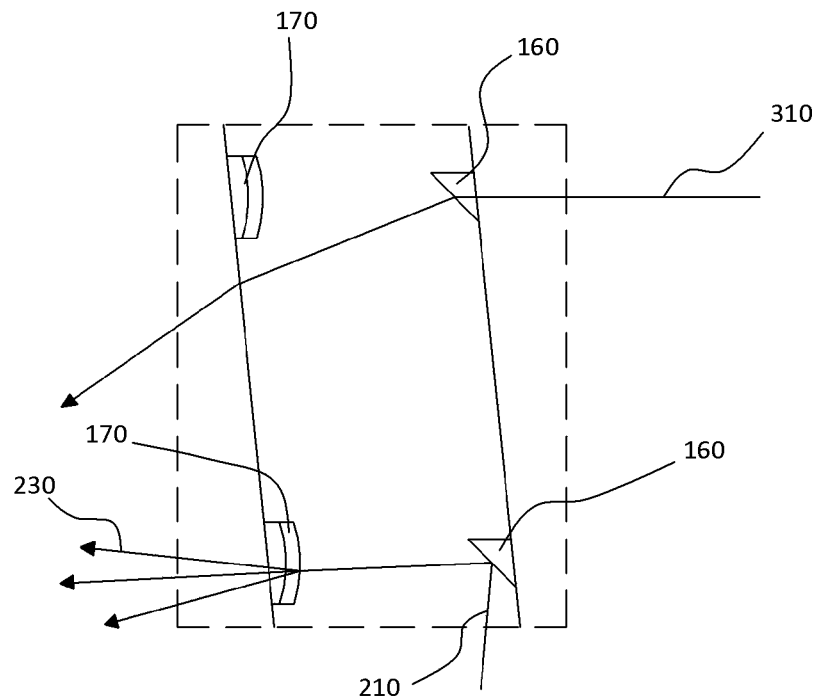
FIG. 6 is a schematic view showing a light propagation path according to an embodiment of the present disclosure.
Figure 7:
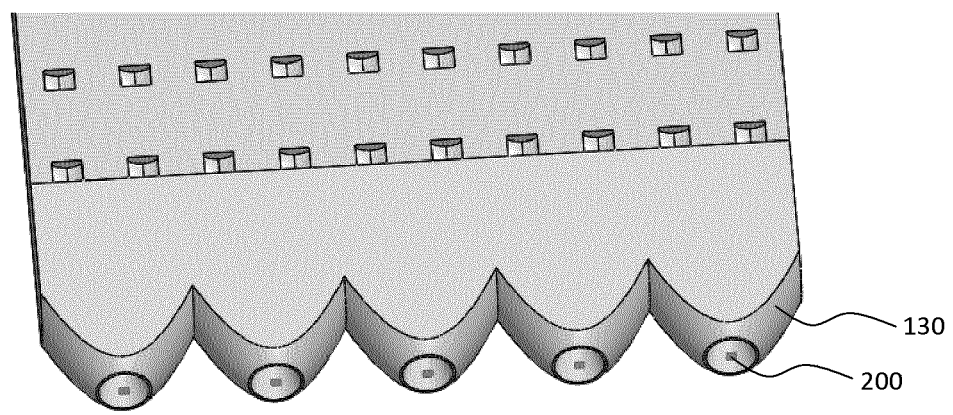
FIG. 7 is an enlarged partial view of FIG. 1 showing the details of the second light incidence surface.
Figure 8:
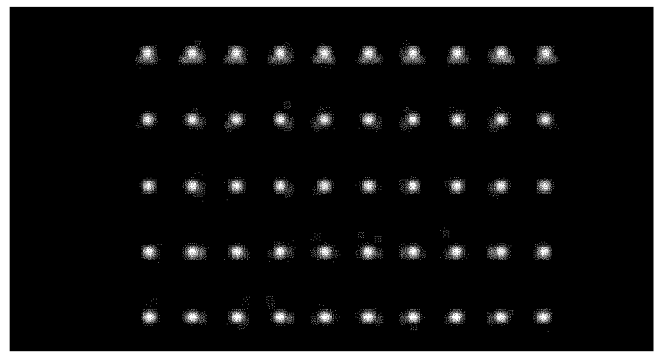
FIG. 8 shows the overall output light beam pattern according to an embodiment of the present disclosure.

The concave structures 160 can be manufactured by an injecting process under pressure. The concave structures 160 each may be a prism-shaped structure, a pyramid-shaped structure (such as a rectangular pyramid) or a wedge-shaped structure. Referring to FIG. 4, we herein take a triangular prism for an example. The triangular prism is a triangular upright prism with three side surfaces "aefb", "aegc" and "bfgc" perpendicular to two base surfaces "abc" and "efg". An angle between a first side surface "aefb" and a second side surface "aegc" of the triangular upright prism may be 90° for easy manufacturing. The first side surface "aefb" of the triangular upright prism extends along the rear surface 110 of the light guide plate 100. The two base surfaces "abc" and "efg" of the triangular upright prism each may have a triangle shape with a first right-angle edge "ab", "ef" and a second right-angle edge "ac", "eg". The length of the first right-angle edge "ab", "ef" is equal to or larger than 0.8 times that of the second right-angle edge "ac", "eg" for facilitating the formation of a TIR (total internal reflection) condition for the second light beam 210. For instance, the length of the first right-angle edge "ab", "ef" is 0.8-2.5 times as large as that of the second right-angle edge "ac", "eg".

Preferably, the plurality of concave structures 160 and the plurality of diffusion structures 170 are respectively arranged equidistantly in rows, wherein the size and level in vertical direction of each row of the concave structures 160 are substantially equal to the size and level in vertical direction of a corresponding row of the diffusion structures 170. In addition, the thickness, i.e., the dimension from the front surface 120 to the rear surface 110, of the light guide plate 100 is preferably arranged large enough to refract the first light beam 310 sufficiently downwards so as to prevent it from hitting the plurality of diffusion structures 170. As a result, glare or dazzling may be restrained or avoided.

In operation, when the first light beam 310 and the second light beam 210 are both turned on at night, on one hand, some light of the first light beam 310, being a low beam here, will hit the concave structures 160 at the rear surface 110 of the light guide plate 100 and will be refracted through the side surface "bfgc" of the concave structures 160 downwards to the ground, thus, they will not go above the cut-off line of the low beam and will not hit the plurality of diffusion structures 170 at the front surface 120 of the light guide plate 100; on the other hand, the second light beam 210 will be reflected by the concave structures 160 into the front direction and diffused by the diffusion structures 170 at the front surface 120 of the light guide plate 100. These dual-path lights can help to create a uniform beam pattern. Therefore, the overall output light beam pattern may appear as many dots when looking from above of the cut-off line at a near distance and may appear completely uniform when looking from a certain distance. Otherwise, when only the second light beam 210 is turned on at daytime, the second light beam 210 will be reflected by the concave structures 160 into the front direction and diffused by the diffusion structures 170 at the front surface 120 into a light beam 230. The output light beam pattern may still be uniform, and appear as many dots when looking from above of the cut-off line at a near distance, and may appear completely uniform when looking from a certain distance.

A light emitting module for an automotive headlight according to the present disclosure includes: the light guide plate 100 described above; a first lighting unit (not shown) positioned backwards and at a distance from the rear surface 110 of the light guide plate 100; and a second lighting unit 200 (see FIG. 7) positioned sidewards of the side surface 130 of the light guide plate 100.

The first lighting unit is e.g. a low beam lighting unit of the automotive headlight, and the second lighting unit 200 is e.g. a daytime running lamp lighting unit or a front position lighting unit of the automotive headlight.

The first lighting unit comprises a first light source and a first reflector for redirecting the light beam of the first light source in a direction perpendicular to the rear surface 110 of the light guide plate 100, and the second lighting unit 200 comprises a second light source (not shown) and a second reflector (not shown) for redirecting the light beam 210 of the second light source in a direction perpendicular to the side surface 130 of the light guide plate 100.

The second lighting unit 200 is configured such that the light beam 210 emitted from the second lighting unit 200 can be totally internally reflected at a side surface "bfgc" of the concave structures 160 facing the second lighting unit 200.

A material of the light guide plate 100 may be PMMA (acrylic), PC (polycarbonate) or ABS (acrylonitrile butadiene styrene). Take PMMA for instance, if the second lighting unit 200 is configured such that the light beam 210 emitted from the second lighting unit 200 hits the side surface "bfgc" of the concave structures 160 at an incidence angle bigger than 42°, the light beam 210 will be totally internally reflected towards the front surface 120 of the light guide plate 100.

Compared with the prior art, since the light guide plate has a plurality of concave structures at the rear surface thereof for refracting the first light beam (usually the low beam) downwards towards the ground and for reflecting the second light beam (usually light beam from a daytime running lamp or a front position lamp) forwards towards the front surface of the light guide plate, when the first light beam and the second light beam are both turned on at night, the overall output light beam pattern would appear to be uniform when looked from above the cut-off line of the low beam.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, number, and arrangement of parts within the principles of the invention to the full extent indicated by the broad general meaning of the terms in which the appended claims are expressed. For instance, besides the rectangle shape as shown in the figures, the light guide plate 100 can also adopt any other shape; the size and depth of the concave structures 160 and of the diffusion structures 170 can be changed as desired to make sure that light appearance will be uniform.

It should be noted that the abovementioned embodiments illustrate rather than limit the invention and that those skilled in the art would be able to design alternative embodiments without departing from the scope of the appended claims.

In the claims, the word "comprising" does not exclude the presence of elements or steps not listed in a claim or in the description. The word "a" or "an" preceding an element does not exclude the presence of a plurality of such elements. In the apparatus claims enumerating several units, several of these units can be embodied by one and the same item of hardware or software. The usage of the words first, second and third, et cetera, does not indicate any ordering. These words are to be interpreted as names only.

Unless otherwise defined, all the technology and scientific terms used in the present description have the meaning as commonly understood by the skilled in the art where the present invention belongs to.

LIST OF REFERENCE SIGNS

100 light guide plate
110 rear surface of light guide plate
120 front surface of light guide plate
130 side surface of light guide plate
160 concave structures
170 diffusion structures
200 second lighting unit
210 second light beam
230 light beam after diffusion at diffusion structures 170
310 first light beam
a, b, c, e, f, g prism corners

The invention claimed is:

1. A light emitting module for an automotive headlight, comprising:
   a light guide plate comprising a front surface for exiting light, a rear surface positioned opposite to the front surface, and a side surface positioned at a side of the light guide plate;
   a first lighting unit of the automotive headlight configured to emit a first light beam incident upon the rear surface of the light guide plate, the first lighting unit positioned backwards and at a distance from the rear surface of the light guide plate; and
   a second lighting unit of the automotive headlight configured to emit a second light beam incident upon the side surface of the light guide plate, the second lighting unit positioned sidewards of the side surface of the light guide plate;
   the light guide plate comprising a plurality of concave structures at the rear surface of the light guide plate, at least one of the plurality of concave structures configured to refract the first light beam downwards towards the ground and configured to reflect the second light beam forwards towards the front surface of the light guide plate.

2. The light emitting module according to claim 1, wherein the light guide plate has a plurality of diffusion structures at the front surface thereof for diffusing the second light beam reflected by the concave structures, and the plurality of concave structures are configured to reflect the second light beam forwards towards the plurality of diffusion structures.

3. The light emitting module according to claim 2, wherein each of the concave structures is a prism-shaped structure, a pyramid-shaped structure or a wedge-shaped structure.

4. The light emitting module according to claim 3, wherein the pyramid is a rectangular pyramid and the prism is a triangular prism.

5. The light emitting module according to claim 4, wherein the triangular prism is a triangular upright prism with three side surfaces perpendicular to two base surfaces.

6. The light emitting module according to claim 5, wherein an angle between a first side surface and a second side surface of the triangular upright prism is 90°.

7. The light emitting module according to claim 6, wherein the first side surface of the triangular upright prism extends along the rear surface of the light guide plate.

8. The light emitting module according to claim 6, wherein each of the two base surfaces of the triangular upright prism has a triangle shape with a first right-angle edge and a second right-angle edge, the length of the first right-angle edge being equal to or larger than 0.8 times that of the second right-angle edge.

9. The light emitting module according to claim 8, wherein the length of the first right-angle edge is about 0.8-2.5 times as large as that of the second right-angle edge.

10. The light emitting module according to claim 2, wherein the plurality of concave structures and the plurality of diffusion structures are respectively arranged equidistantly in rows, and wherein the size and level in vertical direction of each row of the concave structures are substantially equal to the size and level in vertical direction of a corresponding row of the diffusion structures.

11. The light emitting module according to claim 2, wherein the first lighting unit is a low beam lighting unit of the automotive headlight, and the second lighting unit is a daytime running lamp lighting unit or a front position lighting unit of the automotive headlight.

12. The light emitting module according to claim 2, wherein the first lighting unit comprises a first light source and a first reflector for redirecting the first light beam to be emitted from the first light source in a direction perpendicular to the rear surface of the light guide plate, and the second lighting unit comprises a second light source and a second reflector for redirecting the second light beam to be emitted from the second light source in a direction perpendicular to the side surface of the light guide plate.

13. The light emitting module according to claim 2, wherein the second lighting unit is configured such that the second light beam to be emitted from the second lighting unit is totally internally reflected at a side surface of the concave structures facing the second lighting unit.

14. The light emitting module according to claim 2, wherein the light guide plate is made of PMMA, the second lighting unit is configured such that the second light beam to be emitted from the second lighting unit hits a side surface of the concave structures facing the second lighting unit at an incidence angle greater than 42°.

\* \* \* \* \*